United States Patent
Rowlett

[11] Patent Number: 5,159,985
[45] Date of Patent: Nov. 3, 1992

[54] AGRICULTURAL INSERT

[75] Inventor: Don C. Rowlett, Bedford, Pa.

[73] Assignee: Kennametal Inc., Latrobe, Pa.

[21] Appl. No.: 651,662

[22] Filed: Feb. 6, 1991

[51] Int. Cl.$^5$ .......................... A01C 5/06; A01B 23/02
[52] U.S. Cl. .................................... 172/723; 172/747; 111/125; 111/153
[58] Field of Search ............... 111/125, 139, 140, 153; 172/723, 768, 747

[56] References Cited

U.S. PATENT DOCUMENTS

| Re.11,720 | 2/1899 | Brennan et al. | 111/153 |
| 465,220 | 12/1891 | Steinke et al. | 172/768 X |
| 513,664 | 1/1894 | Baughman et al. | 111/153 |
| 1,965,950 | 7/1934 | Walker | 172/747 X |
| 2,885,014 | 5/1959 | Hargis | 111/153 X |
| 3,125,169 | 3/1964 | Geisler | 111/153 X |
| 3,970,445 | 7/1976 | Gale et al. | 75/0.5 B |
| 4,321,972 | 3/1982 | Robertson et al. | 172/721 |
| 4,356,780 | 11/1982 | Bauman | 111/85 |
| 4,457,381 | 7/1984 | Wetmore | 172/722 |
| 4,744,316 | 5/1988 | Lienemann et al. | 111/69 |
| 4,770,253 | 9/1988 | Hallissy et al. | 172/747 X |

FOREIGN PATENT DOCUMENTS

WO85/03618 8/1985 PCT Int'l Appl. .

OTHER PUBLICATIONS

"Acraplant Cropmaker Acra-Plant Drill Shoes" (1989).
McGraw Hill Dictionary of Scientific and Technical Terms, 2nd ed., p. 723.

Primary Examiner—Randolph A. Reese
Assistant Examiner—Jeffrey L. Thompson
Attorney, Agent, or Firm—Larry R. Meenan; John J. Prizzi

[57] ABSTRACT

An insert for use in an agricultural tool having a cutting edge for forming a furrow. The insert includes an elongated wedge having a leading end, a trailing end, a top surface, a first side surface and a second opposing side surface coterminous therewith defining a longitudinally extending lowermost edge. The first and second side surface converge from the trailing end to the leading end and diverge from the lowermost edge to the top surface to form a v-shape leading end. In a preferred embodiment the insert includes a means for aligning the lowermost edge of the insert with the cutting edge of the tool.

18 Claims, 2 Drawing Sheets

AGRICULTURAL INSERT

BACKGROUND OF THE INVENTION

1. Field of the Invention

This invention relates to a new type of insert. More particularly, this invention relates to a new type of insert which may be used in connection with an agricultural tool for forming a furrow.

2. Description of the Related Art

The proper positioning of materials, particularly seeds, into a v-shaped furrow formed in the ground requires special care in forming the furrow in order to orient the materials within the furrow to the best advantage. Conventionally, this has been accomplished by a wide variety of tools such as a furrow forming disk or a furrow forming runner of a type disclosed in U.S. Pat. No. 4,321,972.

Although the many known variations on furrow forming tools such as disks and furrow forming runners have been proven to perform satisfactorily, further improvements on prior art furrow forming tools is desired.

As noted in U.S. Pat. No. 4,321,972, a major problem with previously known furrow forming tools is wear. Wear of a furrow forming tool causes the v-shaped furrow to lose its angular profile such that as seeds are placed into the furrow the seeds may bounce out of the furrow or come to rest at various locations in the lower portion of the furrow in contrast to being placed at bottom dead center as typically occurs when the furrow forming tool is in an unworn state. In addition, wear of the furrow forming tool over time causes a reduction in the depth of the furrow being formed necessitating continual adjustment of the cutting depth of the furrow forming tool resulting in lost time and diminished cost-effectiveness.

U.S. Pat. No. 4,321,972 suggests the use of a wedge-shaped follower for use with a soil-slicing furrow forming tool to increase the useful life of the slicer by decreasing the wear caused by the abrasive effect of the soil. PCT Patent No. WO 85/03618 also suggests the use of a ceramic insert to prevent wear. However, it will be appreciated that a wedge shaped follower contributes to the cost and complexity of the tool and a ceramic insert is expensive, tends to fracture in hard and rocky soil and is difficult to attach to a tool.

The present invention is concerned with a unique insert geometry applicable for use in an agricultural furrow forming tool. Although the prior art has suggested the need to prevent wear of a furrow forming agricultural tool during use, the prior art has not suggested the use of a cemented tungsten carbide insert having a unique geometry which may be simply and effectively secured to an agricultural tool to prevent wear. It will be appreciated that if an insert is positioned incorrectly with respect to the longitudinal cutting edge of an agricultural tool or is of an improper geometry, the bonding integrity of the insert to the tool may be compromised and the tool may perform inadequately.

Accordingly, one aspect of the present invention is to provide an improved insert geometry which can be molded to form a finished product and effectively bonded to an agricultural tool for use in an abrasive rocky soil.

Another aspect of the present invention is to provide a uniquely shaped insert that is economical to manufacture and may be effectively bonded to an agricultural tool to provide an increased wear life over conventional furrow forming agricultural tools.

Yet another aspect of the present invention is to provide a furrow forming tool capable of providing an increased wear life over alloyed and unalloyed irons and steels by the use of an insert in accordance with the present invention.

Another aspect of the present invention is to provide a furrow forming tool which will reduce the downtime necessitated for the replacement of worn furrow forming tools, improve seed to soil contact, improve the efficiency of the planter and create a v-shaped furrow of uniform depth.

SUMMARY OF THE INVENTION

Briefly, according to this invention, there is provided an insert for use in an agricultural tool having a longitudinal cutting edge. The insert includes an elongated wedge having a leading end, a trailing end of a generally triangular planar form, a top surface, a first side surface and a second opposing side surface coterminous therewith defining a longitudinally extending lowermost edge. The first and second side surface converge from the trailing end to the leading end and diverge from the lowermost edge to the top surface to form a v-shape leading end.

The first and second side surface may converge from the trailing end to the leading end at approximately the middle of the length of the insert.

The lowermost edge of the insert includes a substantially linear portion contiguous to a sloped curvilinear front portion.

In a preferred embodiment of the present invention the insert includes a means for aligning the lowermost edge of the insert with the longitudinal cutting edge of the tool. The aligning means of the insert may include a beveled edge. In an alternative embodiment of the present invention the aligning means may include a convex top surface extending between the first and second side surface from the trailing end to the leading end.

The insert is typically made of cemented tungsten carbide, preferably including at least 9.5 weight percent cobalt, and most preferably containing 20 weight percent cobalt.

The insert may be used in an agricultural tool having an essentially syncline-shaped slicer including a leading member, a trailing member and a pair of sides tapered from the trailing member toward a sharp convex cutting edge extending longitudinally upwardly and forwardly from the trailing member toward the leading member. A leading deflector is formed integral with the slicer by a mounting web extending upwardly and forwardly from the cutting edge.

The insert is secured within a corresponding slot formed within the cutting edge such that the insert contacts at least at the apex of the furrow to advance along the furrow to form a v-shaped furrow.

It will be appreciated that the present invention may be incorporated in various other agricultural tools to form a furrow and perform equally as well.

BRIEF DESCRIPTION OF THE DRAWINGS

Further features and other aspects of the invention will become clear from the following detailed description made with reference to the drawings in which.

DESCRIPTION OF THE PREFERRED EMBODIMENTS

Figure 1:
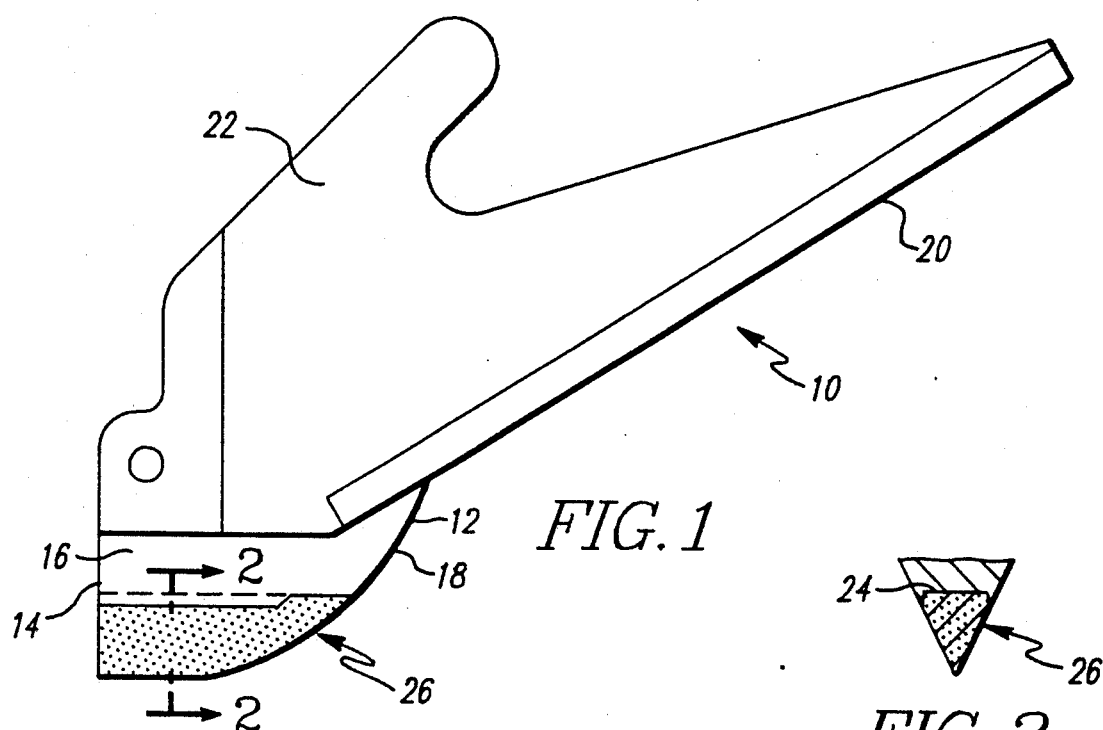
FIG. 1 is a side view of an agricultural tool including an insert in accordance with the present invention.
Figure 2:
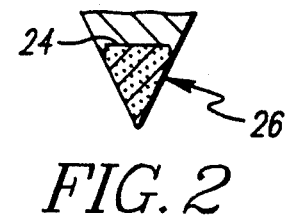
FIG. 2 is a partial cross sectional view of the insert of FIG. 1 taken along line 2—2.

In the following description, like reference characters designate like or corresponding parts. Also, in the following description, it is to be understood that such terms as upwardly, forwardly, rearwardly, outwardly, inwardly, top, back, leading, trailing, lowermost, and the like, are words of convenience and are not to be construed as limiting terms.

Referring now to the figures, there is shown in FIG. 1 an agricultural tool 10 for forming a furrow. The tool 10 includes an essentially syncline-shaped slicer having a leading member 12, a trailing member 14 and a pair of sides 16. The sides 16 taper from the trailing member 14 toward a sharp convex cutting edge 18 which extends longitudinally upwardly and forwardly from the trailing member toward the leading member 12. An elongated leading deflector 20 extends upwardly and forwardly from the cutting edge 18 and is formed integral with the slicer by a mounting web 22. The tool 10 may be fastened to a planter of a type well known in the art such as an International Model 800 Planter.

Formed within the cutting edge 18 of the agricultural tool 10 is a slot 24 having secured therein an insert 26 in accordance with the present invention. The slot 24 is of a substantially identical size and shape as the top surface 34 of the insert 26 as more fully described herein. In a preferred embodiment, the slot 24 of the furrow forming agricultural tool 10 is configured to maintain a lowermost edge 28 of the insert 26 in longitudinal alignment with the cutting edge of the tool.

As shown in the figures, the insert 26 includes a generally elongated wedge having a leading end 30, a trailing end 32, a top surface 34, a first side surface 36 and a second opposing side surface 38 coterminous therewith defining a longitudinally extending lowermost edge 28. The first and second side surface 36 and 38 diverge upwardly from the lowermost edge 28 to a peripheral edge of the top surface 34.

Figure 3:
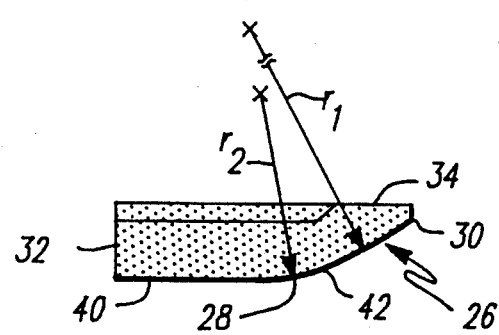
FIG. 3 is a side view of the insert of FIG. 1.
Figure 4:
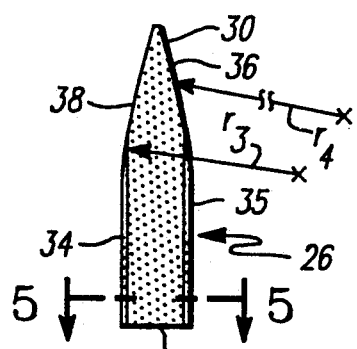
FIG. 4 is a top view of the insert of FIG. 3.
Figure 5:
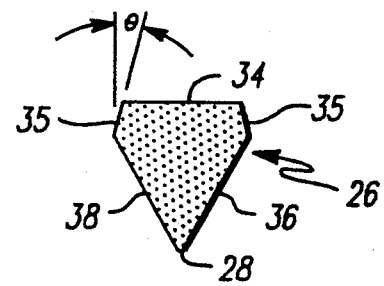
FIG. 5 is a cross sectional view of the insert of FIG. 4 taken along line 5—5.

The leading end 30 of the insert 26 is of a general v-shape to facilitate a slicing action of the tool 10 and protect the bond formed between the insert 26 and the tool, FIGS. 3 and 4. The trailing end 32 of the insert 26 is of a generally triangular planar form extending upwardly from the lowermost edge 28. Although, as shown in FIG. 1, the trailing end 32 of the insert 26 is aligned with the trailing member 14 of the tool 10, it will be appreciated that the trailing end of the insert may also be nonaligned with the trailing member of the tool such that the trailing end abuts against a portion of the tool to provide a bearing surface to distribute the cutting forces from the insert to the tool 10 thereby supporting the insert within the slot 24.

The first and second side surface 36 and 38 of the insert 26 extend forwardly from the trailing end 32 to the leading end 30 and diverge upwardly from a lowermost edge 28 to the top surface 34. More particularly, as shown in FIGS. 1-6, the first and second side surface 36 and 38 converge forwardly from the trailing end 32 to the leading end 30 and diverge upwardly from the lowermost edge 28 to the top surface 34.

The lowermost edge 28 of the insert 26 includes a substantially linear portion 40 contiguous a sloped curvilinear front portion 42 as shown in FIGS. 1-6. The sloped front portion 42 of the lowermost edge 28 includes two compound radii $r_1$ and $r_2$ of approximately 2.5 inches and approximately one inch, respectively, as shown in FIG. 3. It will be appreciated that the lowermost edge 28 of the insert 26 is aligned with the cutting edge 18 of the tool 10 when the insert is secured within the slot 24.

The first and second side surface 36 and 38 extend forwardly from a trailing end 32 and begin to converge at approximately the middle of the length of the insert 26 to form a tapered leading end 30. The first and second side surface 36 and 38 of FIG. 4 converge at a combined radii, $r_3$ and $r_4$, of approximately 1.3 inches and approximately 6.5 inches, respectively, to the tip of the leading end 30.

Figure 7:
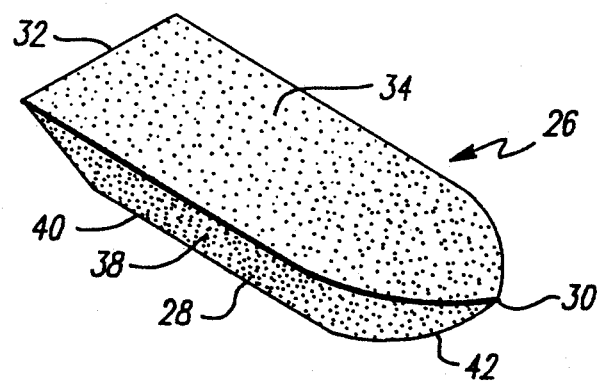
FIG. 7 is an alternative embodiment of an insert in accordance with the present invention.

The top surface 34 of the present invention may include a substantially planar top surface, FIG. 7, or in a preferred embodiment, the top surface may include a means for aligning the insert 26 within the matching slot 24 such that the lowermost edge 28 of the insert is aligned with the cutting edge 18 of the tool 10. It will be appreciated that a nonaligned insert 26 impairs the formation of a v-shape furrow as previously described and has a tendency to direct the tool 10 in an improper direction as the tool is pulled along the ground thereby impeding the formation of a v-shape furrow.

As shown in FIGS. 1-5, the aligning means may include beveled side edges 35 of the top surface 34 of the insert 26. The beveled side edges 35 of the top surface 34 extend along the linear sides of the top surface at an angle, $\theta$, from a line normal to the top surface. In a preferred embodiment the beveled side edges 35 of the top surface 34 are at an angle of approximately 15 degrees from a line normal to the top surface. The beveled side edges of the top surface 34 of the insert 26 provide a means for aligning the insert within an appropriately configured matching slot 24 and provide lateral stability to the insert as the insert is exposed to cutting forces as the agricultural tool 10 forms a furrow. An insert 26 having a top surface 34 including a means for aligning the insert within an appropriately configured matching slot 24 also provides an increased surface area for brazing the insert within the slot thereby increasing the effectiveness of the bond between the tool 10 and the insert.

Figure 6:
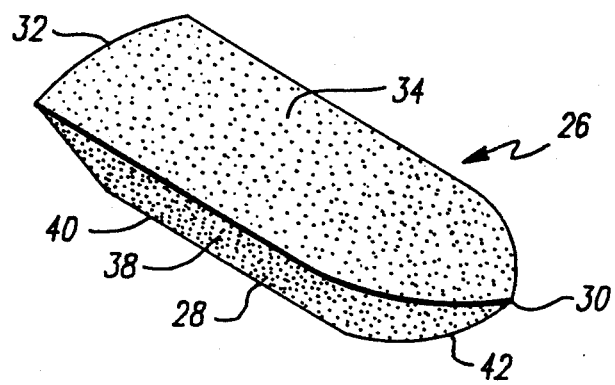
FIG. 6 is an alternative embodiment of an insert in accordance with the present invention.

In yet another embodiment of the present invention the top surface 34, as shown in FIG. 6, includes a convex top surface extending between the first and second side surface 36 and 38 from the trailing end 32 to the leading end 30 for engagement in a correspondingly configured matching slot.

The dimensions of the insert 26 are a function of the size and contour of the tool 10 and the depth of the furrow to be formed. The insert 26 preferably extends along the cutting edge 18 of the tool 10 from at least the apex of the furrow to the bottom of the furrow such that the insert may form substantially all of the v-shaped furrow. It will be appreciated that, as the agricultural tool 10 cuts through the soil, rocks and the like wear away at the material forming the tool. If the insert 26 is not positioned at least at the apex of the furrow, small rocks and the like form a step within the tool 10 above the insert 26, thereby contributing to the deformation of the v-shape of the furrow and possibly dislodging the insert from the slot 24 formed within the tool.

The insert 26 of the present invention is preferably comprised of a cemented tungsten carbide containing cobalt as a binder, optionally with other refractory materials, such as cubic refractory transition metal carbides, as additives. In a preferred embodiment of the present invention the insert 26 includes at least 9 weight percent cobalt, and most preferably 20 weight percent cobalt.

The grain size of the tungsten carbide may vary from fine (e.g. about 1 micron), providing a harder insert, to coarse (e.g. about 12 micron), providing a tougher insert, depending on the intended use, the carbide to binder ratio, and the degree of fracture toughness desired.

The insert 26 may be brazed within the slot 24 by using conventional brazing compositions and techniques known to one skilled in the art.

The documents and patents referred to herein are hereby incorporated by reference.

Having described presently preferred embodiments of the invention, it is to be understood that it may be otherwise embodied within the scope of the appended claims.

What is claimed is:

1. A hard wear resistant cemented carbide insert for use in an agricultural tool for forming a furrow, said insert comprising:
    a leading end;
    a trailing end of a generally triangular form;
    a first side surface and a second side surface extending longitudinally from said trailing end to said leading end, sad first side surface and said second side surface intersecting to define a lowermost edge including a substantially linear portion adjoining a sloped curvilinear front portion; and
    a top surface between said first side surface and said second side surface extending linearly from said trailing end to said leading end and having a contour from said trailing end to said leading end which converges to form a V-shape.

2. The insert as set forth in claim 1 wherein the contour of said top surface converges from said trailing end to said leading end at approximately the middle of the length of said top surface to from said V-shaped leading end.

3. The insert as set forth in claim 2 wherein said top surface includes a means for aligning said insert with respect to the longitudinal cutting edge of the tool.

4. The insert as set forth in claim 3 wherein said aligning means includes a beveled edge.

5. The insert as set forth in claim 4 wherein said insert comprises cemented tungsten carbide.

6. The insert as set forth in claim 5 wherein said cemented tungsten carbide includes at least 9.5 weight percent cobalt.

7. The insert as set forth in claim 5 wherein said cemented tungsten carbide includes 20 weight percent cobalt.

8. The insert as set forth in claim 3 wherein said aligning means includes a convex top surface extending between said first and second side surface from said trailing end to said leading end.

9. The insert as set forth in claim 8 wherein said insert comprises cemented tungsten carbide.

10. The insert as set forth in claim 9 wherein said cemented tungsten carbide includes at least 9.5 weight percent cobalt.

11. The insert as set forth in claim 9 wherein said cemented tungsten carbide includes 20 weight percent cobalt.

12. An agricultural tool for forming a furrow comprising:
    an essentially syncline shaped slicer having a leading member, a trailing member and a pair of sides tapered from said trailing member toward a sharp convex cutting edge extending longitudinally upwardly and forwardly from said trailing member toward said leading member, a leading deflector formed integral with said slicer by a mounting web extending upwardly and forwardly from said cutting edge, said cutting edge including a slot having secured therein an insert comprising
    an elongated wedge shaped member including a leading end;
    a trailing end of a generally triangular form;
    a first side surface and a second side surface contiguous therewith extending longitudinally from said trailing end to said leading end and defining a lowermost edge including a substantially linear portion adjoining a sloped curvilinear front portion; and
    a top surface between said first side surface and said second side surface extending linearly from said trailing end to said leading end and having a contour which converges from said trailing end to said leading end to form a V-shaped leading end.

13. The agricultural tool as set forth in claim 12 wherein said insert includes a means for aligning said insert within said slot formed within said cutting edge.

14. The insert as set forth in claim 13 wherein said first and second side surfaces converge from said trailing end to said leading end at approximately the middle of the length of said insert to form said sloped curvilinear front portion.

15. The insert as set forth in claim 14 wherein said aligning means includes a beveled edge.

16. The insert as set forth in claim 15 wherein said insert comprises cemented tungsten carbide.

17. The insert as set forth in claim 14 wherein said aligning means includes a convex top surface extending between said first and second side surface from said trailing end to said leading end.

18. The agricultural tool as set forth in claim 17 wherein said insert comprises cemented tungsten carbide.

* * * * *